(12) United States Patent
Kim

(10) Patent No.: US 9,114,818 B2
(45) Date of Patent: Aug. 25, 2015

(54) INTEGRATED CONTROL SYSTEM FOR SERVICE DISTRIBUTION CAR USING WIRELESS COMMUNICATIONS AND SERVICE DISTRIBUTION CAR

(71) Applicant: MYUNGSE CMK CO., LTD., Busan (KR)

(72) Inventor: Jong Seob Kim, Busan (KR)

(73) Assignee: MYUNGSE CMK CO., LTD., Busan (KR)

( * ) Notice: Subject to any disclaimer, the term of this patent is extended or adjusted under 35 U.S.C. 154(b) by 204 days.

(21) Appl. No.: 13/891,918

(22) Filed: May 10, 2013

(65) Prior Publication Data

US 2014/0333190 A1    Nov. 13, 2014

(30) Foreign Application Priority Data

May 7, 2013    (KR) .......................... 10-2013-0051396

(51) Int. Cl.
*B62B 3/00*    (2006.01)
*B62B 5/00*    (2006.01)
*G05D 1/02*    (2006.01)

(52) U.S. Cl.
CPC ............ *B62B 5/0076* (2013.01); *G05D 1/0287* (2013.01)

(58) Field of Classification Search
CPC . A47B 2031/002; A47B 31/02; A47J 39/006; F25C 5/002; G08G 1/16
USPC .................. 180/271–274; 701/23; 280/47.35
See application file for complete search history.

(56) References Cited

U.S. PATENT DOCUMENTS 7,025,121 B2 *    4/2006  Whitehead et al. ............. 165/42
2010/0234990 A1 *    9/2010  Zini et al. ...................... 700/245

FOREIGN PATENT DOCUMENTS

KR    10-2002-0000750 A    1/2002

* cited by examiner

*Primary Examiner* — John Walters
*Assistant Examiner* — James Triggs
(74) *Attorney, Agent, or Firm* — Rabin & Berdo P.C.

(57) ABSTRACT

Disclosed is a service distribution car including a heating cabinet and a cooling cabinet for providing meals, the service distribution car including: a body comprising a temperature controller for controlling a temperature of receiving space having the heating cabinet and the cooling cabinet; a plurality of driving wheels fixed to lower portions of the body and coupled to a driving unit for supplying rotating power; and a controller installed on a front surface of the body to control forward and rearward movement, a speed, and set temperatures of the service distribution car and to decelerate or stop the service distribution car when an abnormal travel situation or an emergency stop situation of the service distribution car occurs.

8 Claims, 4 Drawing Sheets

INTEGRATED CONTROL SYSTEM FOR SERVICE DISTRIBUTION CAR USING WIRELESS COMMUNICATIONS AND SERVICE DISTRIBUTION CAR

BACKGROUND OF THE INVENTION

1. Field of the Invention

The present invention relates to an integrated control system for a service distribution car using wireless communications, and more particularly, to an efficient integrated control of a plurality of service distribution cars using a central computer connected to the service distribution cars through wireless communications.

2. Description of the Prior Art

As generally known in the art, a heating/cooling service distribution car for a group meal service, in which meal plates supplied to inpatients or lodgers in hospitals or hotels are carried, are divided into a heating cabinet and a cooling cabinet by an insulating partition installed therein. By using such a service distribution car, a proper temperature suitable for a meal can be set through a simple control of the temperature and the set temperature can be memorized once set to make it unnecessary to repeatedly set the temperature, which makes it possible to provide meals very conveniently.

Further, electric heating/cooling service distribution cars employing an electric driving system to supplement manpower in order to conveniently control stopping of a progress direction thereof have been developed to promptly and safely carry a large amount of foods.

In such a heating/cooling service distribution car, a sensor is attached to a handle such that a speed, forward and reverse movements, and on/off operations of the driving motor can be controlled by using a detected signal, making it possible to operate the service distribution car with a smaller force when the service distribution car is moved forward and rearward, or rotated.

Korean Unexamined Patent Publication No. 2002-0000750 (entitled 'Assist Control System for Electric Heating/cooling service Distribution Car') discloses a technology for a control system for an electric heating/cooling service distribution car.

However, according to the disclosed technology, work efficiency deteriorates since several heating/cooling service distribution cars are individually managed in a large hospital or a meal providing group. Further, the service distribution cars cannot be systematically managed.

SUMMARY OF THE INVENTION

Accordingly, the present invention has been made to solve the above-mentioned problems occurring in the prior art, and an object of the present invention is to provide an integrated control system for a service distribution car using wireless communications in which wireless access points (APs) are provided in controllers of a plurality of service distribution cars to transmit and receive data to and from a central computer so that temperatures and speeds of the service distribution cars can be automatically monitored, and a service distribution car.

In order to accomplish this object, there is provided a service distribution car including a heating cabinet and a cooling cabinet for providing meals, the service distribution car including: a body including a temperature controller for controlling a temperature of receiving space having the heating cabinet and the cooling cabinet; a plurality of driving wheels fixed to lower portions of the body and coupled to a driving unit for supplying rotating power; and a controller installed on a front surface of the body to control forward and rearward movement, a speed, and set temperatures of the service distribution car and to decelerate or stop the service distribution car when an abnormal travel situation or an emergency stop situation of the service distribution car occurs.

Here, the controller includes a temperature sensor mounted to the receiving space, for detecting a set temperature of an interior of the receiving space, a speed control sensor provided on a front surface of the body, for outputting an electric signal according to an applied pressure, a control unit for outputting a control signal to the temperature controller and the driving unit in response to the detected set temperature and the output electrical signal, a monitor for displaying a set temperature and a speed output by the control unit, and a wireless access point connected to the control unit, for transmitting the set temperature and speed to the outside through wireless communications.

The controller includes an acceleration data base stored in advance, and compares an acceleration of the service distribution car with the acceleration database so that if the acceleration of the service distribution car is a first acceleration higher than a normal speed and lower than an acceleration in an emergency stop situation, the controller applies an on signal to a deceleration switch of the controller to decelerate a speed of the service distribution car below a normal speed, or if the acceleration of the service distribution car is higher than an acceleration of the emergency stop situation, the controller applies an on signal to an emergency switch to stop an operation of the service distribution car.

The controller further includes an RFID reader, reads an RFID meal provision tag attached to a meal provision device to for store contents of a meal, and displays the read contents on the monitor so that an accurate meal is delivered by comparing the read content with a meal provision list created based on a patient or a guest.

The controller further includes a rear camera on a rear surface of the body to output a rear field of view on the monitor during rearward movement of the service distribution car so as to prevent a safety accident.

In accordance with another aspect of the present invention, there is provided an integrated control system for a service distribution car, which includes a heating cabinet and a cooling cabinet to provide a meal, using wireless communications, the integrated control system including: a plurality of service distribution cars for storing speeds and set temperature data of the service distribution cars and transmitting the data through wireless communications via a wireless access point provided in a controller; and a central computer for monitoring and analyzing the data transmitted from the service distribution car to control the set temperatures of the distribution cars, calculating the monitored speed to transmit a control signal through wireless communications when an abnormal travel situation or an emergency stop situation occurs so as to decelerate or stop the service distribution cars.

The central computer includes an acceleration data base stored in advance, and compares an acceleration of the service distribution car with the acceleration data base so that if the acceleration of the service distribution car is a first acceleration lower than an acceleration of an emergency stop situation, a control signal is transmitted to a deceleration switch of the controller to decelerate the service distribution car below a normal speed, or if the acceleration of the service distribution car is higher than a second acceleration, a control signal is transmitted to an emergency switch of the controller to stop an operation of the service distribution car.

The service distribution car further includes an RFID reader, reads an RFID meal provision tag attached to a meal provision device to store contents of a meal, and displays the read contents on the monitor and wirelessly transmits the read contents to the central computer so that an accurate meal is delivered by comparing the read content with a meal provision list created based on a patient or a guest.

The central computer creates a meal provision list regarding meal information of a patient or a guest based on a location information tag attached to a desired room, and the central computer wirelessly receives signals output from a door lock sensor provided in the service distribution car and the RFID meal provision tag so that completion of provision of the meal is recognized and the meal provision list is renewed.

According to the integrated control system for a service distribution car using wireless communications and the service distribution car, a plurality of service distribution cars can be collectively and efficiently managed by using wireless communications through a central computer located in a remote site.

Further, according to the integrated control system for a service distribution car using wireless communications and the service distribution car, the service distribution car can be stopped and decelerated even in a situation in which an operation of a user is impossible on an inclined surface so that a dangerous situation can be avoided.

Furthermore, according to the integrated control system for a service distribution car using wireless communications and the service distribution car, when meals are provided to rooms by using the service distribution cars including an RFID reader, foods suitable for inpatients sensitive to treatments or foods suitable for tastes can be accurately delivered.

In addition, according to the integrated control system for a service distribution car using wireless communications and the service distribution car, it can be identified whether foods are accurately delivered to a desired room by using a wireless communication and a sensor technology including RFID, and various meal provision situations can be prepared, identified, and coped with according to requirements of a user.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described in detail with reference to the accompanying drawings.

Figure 1:
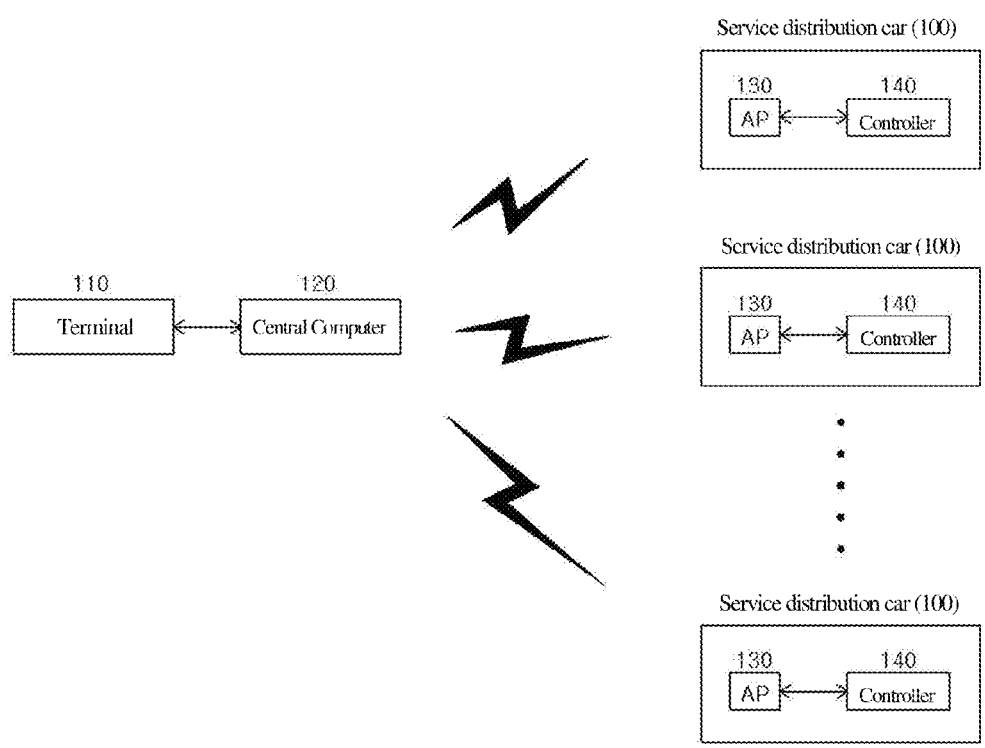
FIG. 1 is a diagram of an integrated control system for a service distribution car using wireless communications according to the present invention.
Figure 2:
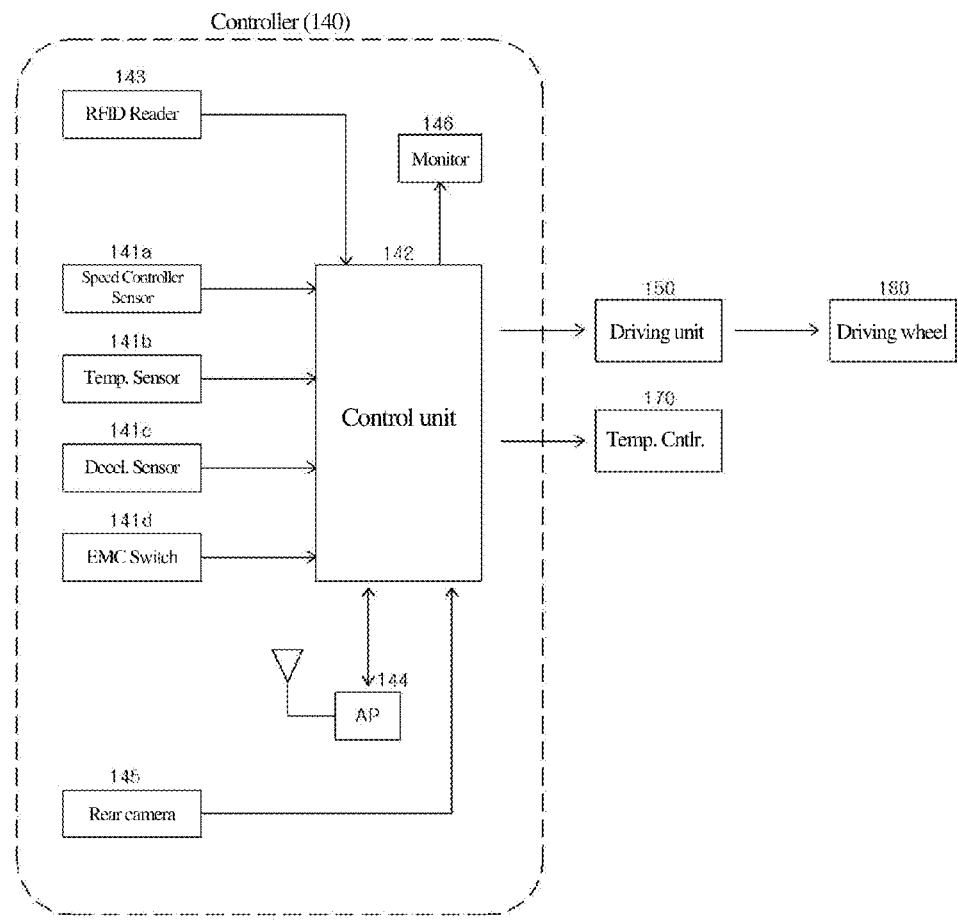
FIG. 2 is a diagram of a controller of FIG. 1.
Figure 3:
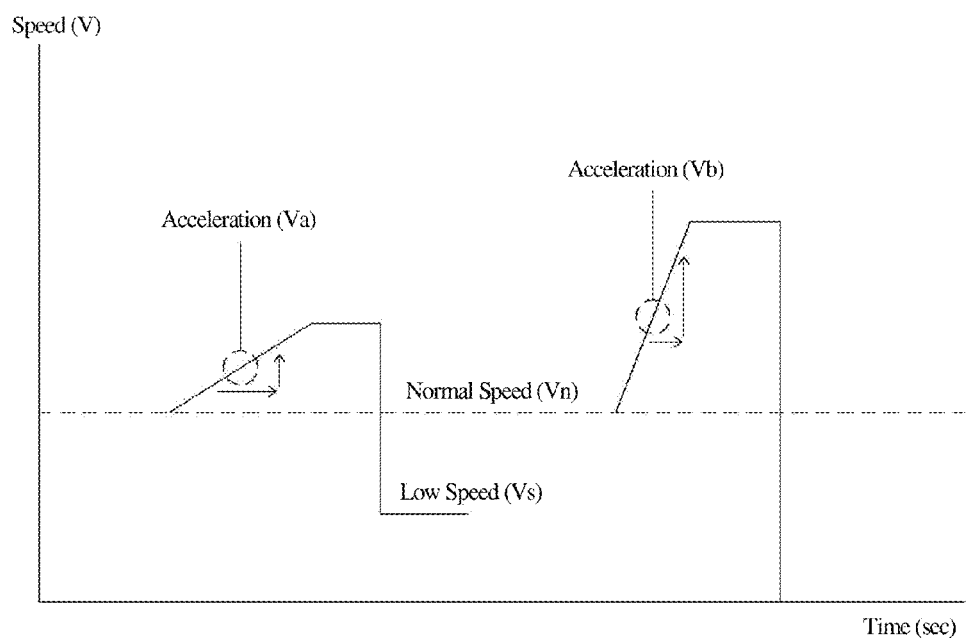
FIG. 3 is a view showing a speed profile depicting an abnormal travel and a stop situation of the service distribution car of FIG. 1.
Figure 4:
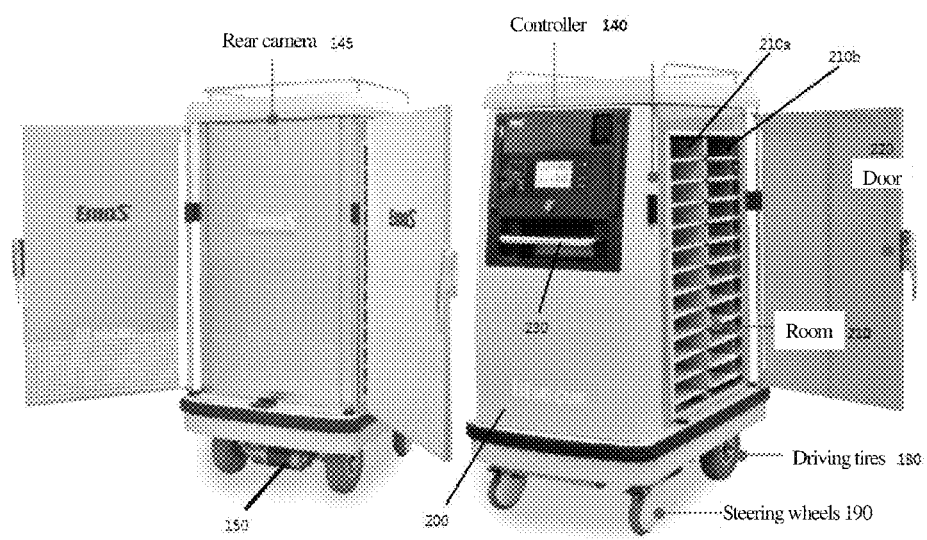
FIG. 4 is a picture of the distribution car including the controller of FIG. 1.

FIG. 1 is a diagram of an integrated control system for a service distribution car using wireless communications according to the present invention. FIG. 2 is a diagram of a controller of FIG. 1. FIG. 3 is a view showing a speed profile depicting an abnormal travel and a stop situation of the service distribution car of FIG. 1. FIG. 4 is a picture of the distribution car including the controller of FIG. 1.

Referring to FIGS. 1 to 4, the service distribution car 100 is a heating/cooling service distribution car including a heating cabinet 210a and a cooling cabinet 210b to provide foods, and includes a body 200, a plurality of driving wheels 180, and a controller 140.

The body 200 includes a temperature controller for controlling a setting temperature of a receiving space 210 including the heating cabinet 210a and the cooling cabinet 210b, and the driving wheels 180 are fixedly installed at lower portions of the body 200 and are coupled to a driving unit 150 for supplying rotating power.

The controller 140 is installed on a front surface of the body 200 to control forward and rearward movement, a speed, and a setting temperature of the service distribution car, and may determine an abnormal travel situation or an emergency stop situation of the service distribution car to decelerate or stop the service distribution car 100.

The body 200 includes a receiving space 210 having a heating cabinet 210a and a cooling cabinet 210b, a door 220 for opening and closing the receiving space 210, a driving unit 150, and a temperature controller 170, and the temperature controller 170 is installed at sides of the heating cabinet 210a and the cooling cabinet 210b and may employ a heater, a compressor, a cooler, and a thermoelectric device.

The service distribution car 100 is supported by a plurality of driving wheels 180 or driving tires. A progress direction of the service distribution car 100 is controlled by controlling a steering angle of a steering wheel 190 installed at a lower portion of the body 200 together with the driving wheels 180, and the receiving space 210 may receive meal plates (meal providing devices) containing foods to supply the foods to patients and/or lodgers.

The driving unit 150 includes a power control module such as an inverter and a driving motor for generating rotating power from electric currents supplied from the power control module, and the power control module may vary electric power output to the driving motor to control a speed of the motor.

The driving wheel 180 is coupled to the driving motor, and an encoder is mounted to the driving shaft of the driving wheel 180 to detect a rotating speed of the driving wheel 180.

The controller 140 includes speed control sensors 141a, temperature sensors 141b, a deceleration switch 141c, an emergency switch 141d, a wireless access point (AP) 144, a rear camera 145, a monitor 146, an RFID reader 143, and a control unit 142.

The speed control sensors 141a are provided in a handle 230 on a front surface of the body 200, and each of the speed control sensors 141a include a pressure sensor or a piezoelectric sensor for outputting an electric signal according to an applied pressure to output the output electrical signal to the control unit 142.

The speed control sensors 141a are located at left and right sides of the handle 230 such that the left speed control sensor 141a is responsible for forward movement and the right speed control sensor 141a is responsible for rearward movement.

The temperature sensors 141b include thermocouples, and are mounted to sides of the heating cabinet 210a and the cooling cabinet 210b to detect set temperatures thereof and output the detected temperatures to the control unit 142.

The control unit 142 includes a CPU, a memory, and a communication module, and outputs control signals to the temperature controller 170 and the driving unit 150 in response to the output signals output from the temperature sensors 141b and the speed control sensors 141a to control the set temperatures and a speed of the service distribution car 100.

The monitor 146 includes a touch panel having an LCD, and may display the set temperatures and speed output by the control unit 142.

The monitor 146 includes a touch panel having an LCD, and displays a meal provision list containing contents of meals, set temperatures, an operation mode including four normal speeds and forward and reverse rotations, and speed. The current data may be stored in a USB memory, and the meal distribution list stored in the USB memory may be input to the control unit 142.

The wireless access point 144 includes a wireless transceiver, and may transmit the set temperatures and the speed of the service distribution car 100 to the central computer 120 located outside in real time.

The deceleration switch 141c and the emergency switch 141d are on/off switches. The control unit 142 includes a database stored in advance, and the service distribution car 100 may be decelerated or stopped according to an on signal of the on/off switch when an abnormal travel situation or an emergency stop situation occurs.

Here, the abnormal travel situation refers, for example, to a service distribution car operating state of a predetermined acceleration Va or higher during a travel of the service distribution car 100 or on a slow inclination, and the emergency stop situation refers to a service distribution car operating state of a predetermined acceleration Vb or higher in a state where the user loses the handle 230 of the service distribution car 100 on an inclined surface so that the service distribution car 100 cannot be controlled.

That is, referring to FIG. 3, the control unit 142 compares the data of the service distribution car 100 with reference data of a database stored in advance. If the acceleration of the service distribution car 100 is a first acceleration Va higher than a normal travel speed Vn and lower than the acceleration Vb in the emergency stop situation, the control unit 142 applies an on signal to the deceleration switch 141c to decelerate the service distribution car 100 to a stored low speed Vs lower than a normal speed. If the acceleration of the service distribution car 100 is higher than a second acceleration Vb in the emergency stop situation, the control unit 142 applies an on signal to the emergency switch 141d to stop an operation of the service distribution car 100.

The reference data correspond to a speed profile showing an abnormal travel situation and a stop situation of the service distribution car of FIG. 3. The first acceleration Va and the second acceleration Vb may be a positive number or a negative number and are determined with reference to their absolute values. The control unit 142 calculates acceleration by using a speed detected by an encoder, and is an optimum experimental pattern for simulating various unexpected situations and avoiding danger due to the situations.

Here, if the deceleration switch 141c is switched on, the driving unit 150 reversely charges a current of the driving motor operated as a power generator to a battery through a regeneration brake method such that the driving motor acts as a load to lower the speed of the service distribution car to a lower speed Vs, thereby preventing deterioration of a brake unit and improving durability.

The service distribution car 100 employs a battery as a power source, and controls charging and temperature in the stop mode.

The driving unit 150 further includes a mechanical brake unit so that the service distribution car 100 is stopped immediately after the emergency switch 141d is switched on to prevent collision with an obstacle.

The RFID reader 143 may be located on one side surface of an upper portion of the controller 140 or the body 200. That is, the controller 140 may further include the RFID reader 143. The RFID reader 143 may read an RFID meal provision tag attached to the meal providing device and storing contents of the meal and display the contents to the monitor 146 so that the foods can be delivered to a patient and/or a guest by comparing the contents with the meal provision list based on the patient and/or the guest.

The RFID tag is attached to one side surface of the meal provision device (meal plate), and stores contents of the meal according to a desired room and may store a meal provision list including a room number, a name of a patent, and meal information.

The controller 140 includes a rear camera 145 at an upper portion of a rear surface of the body 200 and outputs a rear field of view to the monitor 146 during a rearward movement to avoid collision with an obstacle located on the rear side and prevent a safety accident.

The controller 140 may store and/or control (and/or renew) data including operation start, stop, forward/rearward movement, speed control, set temperatures of the heating cabinet 210a and the cooling cabinet 210b, an event of the set temperature, a desired set temperature at a time desired by a user, setting of a reserved temperature including operation time, and a meal provision list, and may transmit the stored data to the central computer 120 located outside through the wireless access point 130 provided in the controller 140.

The deceleration switch 141c and the emergency switch 141d include a logic sum circuit to generate a triggering signal in the control unit 142 according to a pressure or an on control signal.

The integrated control system for a service distribution car of the present invention includes a terminal 110, a central computer 120, and a plurality of service distribution cars 100. The terminal 110 may be a terminal located in a manufacturer of the service distribution car, and is connected to the central computer 120 through a wired/wireless internet.

The central computer 120 transmits the stored and renewed data to the terminal 110 such as a PC, a PDA, and a portable terminal connected through a wired/wireless communication network such as the Internet, and identifies an operation state through remote monitoring to prevent a breakdown in advance and maximize maintenance efficiency.

Since the service distribution cars 100 has the same configuration and operation as those of the service distribution car 100 described above, a repeated description thereof will be omitted.

The service distribution car 100 of the integrated control system for a service distribution car using wireless communications includes a body 200 supported by a plurality of driving wheels 180 and having a receiving space 210 for receiving meal plates containing foods, and a controller 140 provided on a front surface of the body 200, for controlling a speed of the driving wheels 180.

The service distribution car 100 stores data regarding a speed of the service distribution car 100 and set temperatures, and transmits the data to the central computer 120 through wireless communications via a wireless access point provided in the controller 140.

The central computer 120 includes a CPU, an input/output unit, a communication module for wireless transmission and reception. The central computer 120 monitors and analyzes the data transmitted from the service distribution car 100 in real time and controls set temperatures of the service distribution car 100 in response. Further, the central computer 120 calculates the monitored speed, and when an abnormal situation or an emergency stop situation occurs, transmits a control signal through wireless communications to decelerate or stop the service distribution car 100.

The central computer 120 includes an acceleration database stored in advance. The central computer 120 compares the data of the service distribution car 100 with reference data (a speed profile of FIG. 3) of the acceleration database, and if the acceleration of the service distribution car 100 is a first acceleration Va higher than a normal speed on a relatively slow inclination or an acceleration Vb in an emergency stop situation, a control signal is transmitted to the deceleration switch 141c of the controller 140 to decelerate the service distribution car 100 to a low speed (Vs: about ½ to ⅓ of a normal speed Vn) lower than a normal speed Vn, or when the acceleration of the service distribution car 100 is higher than a second acceleration Vb, a control signal is transmitted to the emergency switch 141d of the controller 140 to stop an operation of the service distribution car 100.

The central computer 120 creates a meal provision list regarding meal information of a patient or a guest for the meal based on a location information tag (not shown) attached to a desired room, and a signal output from a door lock sensor (not shown) provided in a door 220 of the service distribution car 100 and the RFID meal provision tag (not shown) is wirelessly received by the central computer 120 so that completion of provision of meals are recognized and the meal provision list is renewed.

Here, the central computer 120 may detect operation signal data including opening and closing of the door 200 to which a door lock sensor (not shown) is attached, and may monitor a meal provision situation by using the operation signal data and the RFID meal provision tag data after reading the RFID meal provision tag data.

The operation signal data and the RFID meal provision tag data are detected and calculated through the controller 140 and are transmitted to the central computer 100.

That is, the central computer 100 may identify locations of the service distribution cars 100 by using location information tags attached to rooms so that the locations of the rooms can be recognized.

The central computer 100 receives images in real time through wireless communications from a rear camera 145 provided at an upper portion of the rear surface of the body 100, monitors a rear field of view during rearward movement of the service distribution car 100, and generates an alarm signal provided in the controller 140 to prevent the user from colliding with an obstacle and prevent a safety accident in advance.

Since the integrated control system for a service distribution car using wireless communications and the service distribution car can identify locations of service distribution cars 100, the most nearby service distribution car 100 according to a change of meal information can be arranged so that meals can be provided most accurately and promptly to meet the requirements of patients and/or customers and manpower can be efficiently managed.

What is claimed is:

1. A service distribution car including a heating cabinet and a cooling cabinet for providing meals, the service distribution car comprising:
    a body including a temperature controller for controlling a temperature of a receiving space having the heating cabinet and the cooling cabinet;
    a plurality of driving wheels fixed to a lower portion of the body and coupled to a driving unit for supplying rotating power; and
    a controller installed on a front surface of the body to control forward and rearward movement, a speed, and the temperature of the service distribution car and to decelerate or stop the service distribution car when an abnormal travel situation or an emergency stop situation of the service distribution car occurs,
    wherein the controller comprises
        a temperature sensor mounted to the receiving space, for detecting the temperature of an interior of the receiving space,
        a speed control sensor provided on the front surface of the body, for outputting an electric signal according to an applied pressure,
        a control unit for outputting a control signal to the temperature controller and the driving unit in response to the detected temperature and the output electrical signal,
        a monitor for displaying the detected temperature and the speed, and
        a wireless access point connected to the control unit, for transmitting the temperature and speed to the outside through wireless communications.

2. The service distribution car as claimed in claim 1, wherein the controller further comprises an acceleration database stored in advance, and compares an acceleration of the service distribution car with the acceleration database so that if a current speed of the service distribution car is higher than a normal speed and a current acceleration thereof is lower than an acceleration in an emergency stop situation, the controller applies an on signal to a deceleration switch of the controller to decelerate the speed of the service distribution car below the normal speed, or if the current speed of the service distribution car is higher than the normal speed and the current acceleration thereof is higher than the acceleration of the emergency stop situation, the controller applies an on signal to an emergency switch to stop an operation of the service distribution car.

3. The service distribution car as claimed in claim 1, wherein the controller further comprises an RFID reader for reading an RFID meal provision tag which is attached to a meal provision device and stores contents of a meal, and displaying the read contents on the monitor so that an accurate meal is delivered by comparing the read content with a meal provision list created based on a patient or a guest.

4. The service distribution car as claimed in claim 3, wherein the controller further comprises a rear camera on a rear surface of the body to output a rear field of view on the monitor during rearward movement of the service distribution car so as to prevent a safety accident.

5. An integrated control system for a service distribution car, which comprises a heating cabinet and a cooling cabinet to provide a meal, using wireless communications, the integrated control system comprising:
    a plurality of service distribution cars for detecting speeds and temperatures of the service distribution cars and transmitting the speeds and temperatures through wireless communications via a wireless access point provided in a controller; and
    a central computer monitoring and analyzing the speeds and temperatures transmitted from the service distribution cars to control the temperatures of the distribution cars, calculating the detected speeds to transmit control signals through wireless communications when an abnormal travel situation or an emergency stop situation occurs so as to decelerate or stop the service distribution cars, wherein the central computer comprises an acceleration database stored in advance, and compares an acceleration of the service distribution car with the acceleration database so that if a detected speed of the service distribution car is higher than a normal speed and a detected acceleration thereof is lower than an acceleration of an emergency stop situation, a control signal is transmitted to a deceleration switch of the controller to decelerate the service distribution car below the normal speed, or if the detected speed of the service distribution car is higher than the normal speed and the detected acceleration thereof is higher than the acceleration of the emergency stop situation, a control signal is transmitted to an emergency switch of the controller to stop an operation of the service distribution car.

6. The integrated control system as claimed in claim 5, wherein the service distribution car further comprises an RFID reader for reading an RFID meal provision tag which is attached to a meal provision device and stores contents of a meal, displaying the read contents on the monitor and wirelessly transmitting the read contents to the central computer so that an accurate meal is delivered by comparing the read content with a meal provision list created based on a patient or a guest.

7. The integrated control system as claimed in claim 6, wherein the central computer creates the meal provision list regarding meal information of the patient or the guest based on a location information tag attached to a desired room, and the central computer wirelessly receives signals output from a door lock sensor provided in the service distribution car and the RFID meal provision tag so that completion of provision of the meal is recognized and the meal provision list is renewed.

8. The service distribution car as claimed in claim 2, wherein the controller further comprises an RFID reader for reading an RFID meal provision tag which is attached to a meal provision device and stores contents of a meal, and displays the read contents on the monitor so that an accurate meal is delivered by comparing the read content with a meal provision list created based on a patient or a guest.

* * * * *